United States Patent Office 3,113,836
Patented Dec. 10, 1963

3,113,836
STABILIZED NITRIC ACID
Jennings P. Blackwell, Bartlesville, Okla., assignor to Phillips Petroleum Company, a corporation of Delaware
No Drawing. Filed Aug. 12, 1959, Ser. No. 833,352
11 Claims. (Cl. 23—157)

This invention relates to stabilized nitric acid. In one aspect this invention relates to the stabilization of concentrated nitric acid. In another aspect this invention relates to a stabilized oxidizer mixture comprising nitric acid and ammonium persulfate and/or an alkali metal persulfate. In another aspect this invention relates to monopropellant compositions suitable for use in rocket motors and a method of operating such motors using said monopropellants.

Concentrated nitric acids such as are sold in the form of ordinary concentrated acid, white fuming nitric acid (WFNA), red fuming nitric acid (RFNA), and anhydrous nitric acid are important commercial products. These materials have many important uses such as for the preparation of fertilizers, in cleaning and etching solutions, etc. In recent years said concentrated nitric acids have been used as an oxidizer ingredient for rocket propellants, in both bipropellant applications and in monopropellant applications. When used as the oxidizer component in a bipropellant system the acid is carried in the rocket or missile in a separate compartment or tank and is injected into the combustion chamber of the rocket motor as a separate stream where it contacts the fuel component, also injected as a separate stream. Said fuel componnet can be a hypergolic fuel, such as aniline, in which case spontaneous ignition takes place upon contact between the acid and the hypergolic fuel. Said fuel can also be a non-hypergolic fuel in which case the mixture formed when the acid and fuel are contacted is ignited by any suitable means such as a spark igniter. Monopropellant compositions consisting essentially of a fuel component such as an amine nitrate dissolved in nitric acid represent another application for said acids. In this type of application the monopropellant is stored in a tank carried by the rocket and is injected into the combustion chamber of said rocket where it is ignited.

Nitric acids, particularly concentrated nitric acids are not stable during storage, and tend to decompose according to the reaction:

$$4HNO_3 \rightarrow 4NO_2 + 2H_2O + O_2$$

Such decomposition of nitric acid during storage not only decreases the oxidizing power of the acid but also builds up pressure in the storage vessel. Over a period of time gas pressure can build up in the storage vessel to a point which constitutes a serious hazard, and can sometimes even result in rupture of the storage vessel. Even when the acid is stored in a vented vessel so that storage pressure is of no concern, the loss in product quality which occurs upon prolonged storage is serious. Thus, it is important for all uses of nitric acid that, if possible, said acid be stabilized to reduce decomposition during storage. Stabilization is particularly important where the acid must be stored in closed containers, such as in the fuel tanks in a rocket motor, etc.

I have discovered that ammonium persulfate and the alkali metal persulfates are effective stabilizers for nitric acid. Thus, broadly speaking, the present invention resides in a stabilized nitric acid containing a small but effective amount of at least one of said persulfates.

In copending application Serial No. 678,243, filed August 14, 1957, by H. M. Fox, there are disclosed and claimed monopropellant compositions suitable for use in rocket motors and a method of operating such motors using said monopropellants. Broadly speaking, said monopropellant compositions comprise an amine nitrate and a suitable oxidant, for example, nitric acid. I have found that the utility of monopropellants comprising a mixture of an amine nitrate and nitric acid can be enhanced by preparing said monopropellants with a nitric acid stabilized as described herein. The use of said stabilized acid increases the storage stability of said mixtures, i.e., the monopropellant mixture can be stored at higher temperatures for longer periods of time. Thus, an added feature of the present invention is the use of said stabilized acid to form a stabilized mixture of an amine nitrate and nitric acid which can be used as a monopropellant in the operation of rocket motors.

An object of this invention is to provide a stabilized nitric acid. Another object of this invention is to provide an improved oxidizer mixture which is suitable for use in reaction motors, such as rocket motors, etc. Another object of this invention is to provide an improved stabilized monopropellant composition and a method of using said composition in a rocket motor to develop thrust. Still another object of this invention is to provide a stabilized nitric acid which can be safely stored in closed containers. Other aspects, objects, and advantages of the invention will be apparent to those skilled in the art in view of this disclosure.

Thus, according to the invention, there is provided a stabilized nitric acid comprising nitric acid and from about 0.01 to about 10 weight percent of said acid of at least one inorganic persulfate selected from the group consisting of ammonium persulfate and the alkali metal persulfates.

Further according to the invention there are provided improved monopropellant compositions comprising a mixture of (1) said stabilized nitric acid as an oxidant and (2) an amine nitrate as a fuel component.

Still further according to the invention there is provided a method of operating a rocket motor which comprises the step of injecting the monopropellant compositions of the invention into the combustion chamber of a reaction motor.

Amine nitrates suitable for use in the practice of the invention include, among others, piperidine nitrate, pyridine nitrate, and amine nitrates having a structural formula selected from the group consisting of

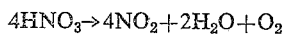 or 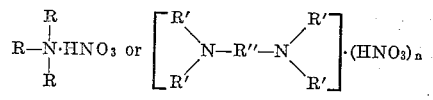

wherein: each R and each R' is selected from the group consisting of acyclic, alicyclic, and aromatic hydrocarbon radicals containing from 1 to 8 carbon atoms, and hydrogen, at least one R being one of said hydrocarbon radicals; and R'' is selected from the group consisting of (a) alkylene, alkenylene, and alkynylene hydrocarbon radicals containing from 2 to 8 carbon atoms wherein the carbon atoms attached to the nitrogen atoms are attached to adjoining carbon atoms by single valence bonds, and (b) +R'''—X+$_y$R''' radicals wherein each R''' is an alkylene radical containing from 2 to 4 carbon atoms, and each X is selected from the group consisting of oxygen, sulfur, and

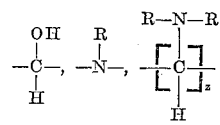

radicals wherein R is defined as above, y is an integer of from 1 to 3, z is an integer of from 1 to 3, and n an integer from 1 to 5;

the total number of carbon atoms in the molecule does not exceed 40, and the total number of amino nitrogen atoms in the molecule does not exceed 10.

Examples of amine nitrates suitable for use in the practice of the invention include, among others, the following:

Methylamine nitrate
Dimethylamine nitrate
Trimethylamine nitrate
Ethylamine nitrate
Diethylamine nitrate
Triethylamine nitrate
Propylamine nitrate
Dipropylamine nitrate
Tripropylamine nitrate
Isopropylamine nitrate
Tertiary butylamine nitrate
Isobutylamine nitrate
Cyclopentylamine nitrate
Cyclohexylamine nitrate
Cyclooctylamine nitrate
Dicyclohexylamine nitrate
Tricyclohexylamine nitrate
4-cyclohexenylamine nitrate
Phenylamine nitrate
Diphenylamine nitrate
Tri-n-butylamine nitrate
N,N-di-n-octyl-p-tolylamine nitrate
o-Methylbenzylamine nitrate
N,N,N',N'-tetramethylethane-1,2-diamine dinitrate
N,N,N',N'-tetraethylethane-1,2,-diamine dinitrate
N,N,N',N'-tetra-n-octylethane-1,2-diamine dinitrate
N,N,N',N'-tetramethylpropane-1,2-diamine dinitrate
N,N,N',N'-tetramethylpropane-1,3-diamine dinitrate
N,N,N',N'-tetraethylpropane-1,3-diamine dinitrate
N,N,N',N-tetrabutylpropane-1,3-diamine dinitrate
N,N,N',N'-tetrahexylpropane-1,3-diamine dinitrate
N,N,N',N'-tetramethylbutane-1,4-diamine dinitrate
N,N,N',N'-tetracyclohexylbutane-1,4-diamine dinitrate
N,N,N',N'-tetraphenylbutane-1,4-diamine dinitrate
N,N,N',N'-tetraphenyl-n-4-octene-1,3-diamine dinitrate
N,N,N',N'-tetracyclohexylhexane-2,6-diamine dinitrate
N,N,N',N'-tetramethyl-2-butene-1,4-diamine dinitrate
N,N,N',N'-tetramethyl-2-butyne-1,4-diamine dinitrate
N,N,N',N'-teramethyl-2-octene-4,8-diamine dinitrate
N-phenyl-N'-n-octylethane-1,2-diamine dinitrate
N,N,N',N'-tetra-n-octyloctane-1,2-diamine dinitrate
N,N'-di(2-ethylhexyl)-2-butene-1,4-diamine dinitrate
N,N,N',N'-tetraethyl-4-octyne-1,8-diamine dinitrate
Bis-(N,N-dimethylaminoethyl)ether dinitrate
Bis-(N,N-di-n-octylamine-n-butyl)ether dinitrate
N-cyclohexylaminopropyl-N'-phenylaminopropyl ether dinitrate
N-2-ethylphenylaminoethyl amino-n-butyl ether dinitrate
Bis(amino-n-butyl)ether dinitrate
Bis(N,N-di-2-ethylcyclohexylamine-n-butyl)thioether dinitrate
Bis(aminoethyl)thioether dinitrate
Bis(N,N-dimethylaminoethyl)thioether dinitrate
N,N,N',N'-tetramethyl-1,3,-diamine-2-propanol dinitrate
N,N,N',N'-tetraethyl-1,9-diamino-5-nonanol dinitrate
N,N,N'-tri-(2-ethylcyclohexyl)-1,4-diamino-2-butanol dinitrate
N,N,N',N'',N''-pentamethyldiethylenetriamine trinitrate
N,N',N''-tricyclohexyldiethylenetriamine dinitrate
N,N,N'-tri-n-octyldiethylenetriamine trinitrate
N,N,N',N',N'',N''-hexamethylpropane-1,2,3-triamine trinitrate
$N_1,N_1,N_2,N_2,N_3,N_3,N_4,N_4,N_5,N_5$-decamethylpentane-1,2,3,4,5-pentamine pentanitrate
$N_1,N_2,N_3,N_4,N_5$-pentaethyltetraethylenepentamine pentanitrate
N-ethyl-2-butynylamine nitrate
N-methyl-2-butynylamine nitrate
Di(2-butynyl)amine nitrate
N-hexyl-2-propynylamine nitrate
N-propyl-3-hexynylamine nitrate The inorganic persulfate compounds are effective as stabilizers for nitric acids when used in small amounts. Generally, the amount used to stabilize the nitric acid is in the range of 0.1 to 10 percent, preferably within the range of about 0.5 to 5 percent, by weight of the acid. However, beneficial effects result from the use of even smaller amounts, e.g., as low as 0.01 percent; and greater amounts, e.g., 10 to 15 percent can be used. The invention is applicable for stabilizing nitric acid of any concentration ranging from dilute acids containing as little as 1 weight percent $HNO_3$ up to and including anhydrous acids containing essentially 100 weight percent $HNO_3$. However, since the more concentrated acids are more unstable, the invention finds its greatest use in stabilizing the more concentrated acids, particularly those containing at least about 50 weight percent, or more, $HNO_3$. The invention is particularly applicable for stabilizing the concentrated white fuming nitric acids, red fuming nitric acids, and anhydrous nitric acids which are available commercially. White fuming nitric acid usually contais about 90 to 99 weight percent $HNO_3$, from 0 to 2 weight percent $NO_2$, and up to about 10 weight percent water. Red fuming nitric acid usually contains about 70 to 90 weight percent $HNO_3$, from 2 to 25 weight percent $NO_2$, and up to about 10 weight percent water. Fuming nitric acids, both white and red, having concentrations of water, $NO_2$ and $HNO_3$ different from those given can of course be stabilized in accordance with the invention.

In the practice of the invention the acid to be stabilized can be mixed with one or more of the above-described inorganic persulfate compounds in any convenient manner. It is generally preferred to add the persulfate compound to the acid at temperatures below about 50° C., e.g., 0 to 30° C., with good agitation. The resulting acid solutions have an enhanced storage stability as measured, for example, by measuring changes in pressure in a closed container containing the acid solutions in storage.

As used herein the term "alkali metal persulfates" includes sodium persulfate, potassium persulfate, lithium persulfate, rubidium persulfate, and cesium persulfate. Also, as used herein, the term "persulfate" refers to the $=S_2O_8$ radical or anion. For example, see "Hackh's Chemical Dictionary," Third Edition, page 634, McGraw-Hill Book Co. Inc., New York (1944) where "persulfate" is defined as "a salt derived from persulfuric acid, which contains the $=S_2O_8$ radical; made by the electrolysis of sulfate solutions"; or see "The Condensed Chemical Dictionary," Fifth Edition, Reinhold Publishing Corp., New York (1956), where on page 898 the formula of potassium persulfate is given as $K_2S_2O_8$.

Since water tends to retard combustion of the acid with the fuel, the nitric acid used in the monopropellants of the invention is preferably substantially free of water. Thus, the presently most preferred oxidant is anhydrous nitric acid. However, other more dilute nitric acids can be used in the practice of the invention. As indicated above white fuming nitric acids and red fuming nitric acids of varying concentrations are available commercially, and all are useful in the practice of this invention. Of course, mixtures of the above described fuming acids can be employed to give an acid having any intermediate composition, and all are useful in the practice of this invention. Thus, it has been found that nitric acids of all types containing at least about 70 weight percent $HNO_3$ are useful as an oxidant in the monopropellants of the invention.

The monopropellants used in the practice of the present invention are preferably near stoichiometric mixtures of the stabilized nitric acid and the amine nitrate. The ratio of fuel component to oxidant can be in the range of 0.75 to 1.25 times that of the stoichiometric amount. A slightly fuel-rich mixture is usually required to give optimum rocket motor performance. Said monopropellants can be prepared in any suitable manner. The stabilizing agent can be added to the acid first in the manner described and the amine nitrate then added to the resulting solution, or the amine nitrate can be added to the acid first or simultaneously with the addition of said stabilizing agent. In any mixing step or steps it is preferred that the mixing be carried out at temperatures below 50° C., e.g., 0 to 30° C.

The following examples will serve to further illustrate the invention.

EXAMPLE I

Anhydrous nitric acid was prepared by distilling red fuming nitric acid in the presence of sulfuric acid. Analyses of typical batches of a distilled anhydrous nitric acid showed that the product contained more than 99.8 weight percent $HNO_3$ and less than 0.2 weight percent oxides of nitrogen.

The effectiveness of the inorganic persulfate compounds as stabilizing agents for nitric acid is shown by a comparison of the storage stability at 200° F. of a sample of said anhydrous acid containing 1 weight percent of ammonium persulfate with another sample of said anhydrous nitric acid containing no stabilizing agent. The storage stability of said two samples was determined according to the following procedure.

A small glass tube constructed from one-fourth inch I.D. glass pipe, which will withstand a pressure greater than 1,000 p.s.i., is filled about two-thirds full (about 6 milliters) with the nitric acid to be tested. Said tube is fitted with a safety head containing a blowout disc which will rupture at about 200 p.s.i. pressure. The small glass bomb is then placed in a constant temperature bath containing cold water and is connected to a pressure recorder and to a supply of compressed nitrogen gas. The pressure in said bomb is then increased to about 75 p.s.i.g. with nitrogen to check the system for leaks and, after checking, the pressure in said bomb is reduced to 20 p.s.i.g. The temperature in the constant temperature bath, which can be regulated to maintain a temperature of 200° F., is increased and the time at which a temperature of 200° F. is reached is taken as the start of the test. The test is terminated when the pressure in said bomb exceeds 100 p.s.i., or when the blowout disc is ruptured (the pressure rise is often rapid after 100 p.s.i. is reached). The storage life of the acid being tested is recorded as the time necessary for the pressure in said bomb to increase from 20 to 100 p.s.i. at a temperature of 200° F.

The results of the above tests showed that the pressure in the bomb containing the acid stabilized with ammonium persulfate increased to a maximum pressure of 95 p.s.i.g. during the first 5 hours of the test and then decreased slowly to 80 p.s.i.g. during the succeeding 856 hours after which the test was terminated. Thus the stabilized acid had a storage life greater than 861 hours. The pressure in the bomb containing the sample of unstabilized nitric acid increased to 61 p.s.i.g. in 9 hours and the test was terminated after 28 hours when the pressure in said bomb had reached 100 p.s.i.g. Thus, the unstabilized acid had a storage life of only 28 hours.

The above tests show that the nitric acid stabilized with ammonium persulfate had a storage life more than 30 times longer than the unstabilized nitric acid.

Amine nitrates can be prepared by several methods. One method is to react an amine with nitric acid. Another method which can be employed is to form a salt of the amine, such as a hydrochloride or an acetate, and then react the amine salt with nitric acid.

EXAMPLE II

A number of runs were made in which polyamine compounds were reacted with nitric acid to form the corresponding amine nitrates. These runs were carried out according to the following procedure.

An amount of the pure polyamine compound was charged to a flask, after which an amount of aqueous nitric acid was charged slowly to said flask by means of a dropping funnel. The temperature of the flask contents was maintained within the range of from 0 to 10° C. by means of an ice bath and by adjusting the rate of addition of the nitric acid to keep the temperature of the reaction mass below 10° C. During the addition of the nitric acid, the flask contents were stirred vigorously. After the nitric acid had been charged, the flask contents were stirred for several minutes to insure complete reaction, after which said flask contents were poured into approximately 5 times its volume of chilled acetone (−10 to −25° C.). The amine nitrate precipitated out. This precipitate was recovered by filtration, washed with cold acetone or ether, and dried in a vacuum desiccator at room temperature. The melting point and stability of the amine nitrate were then determined. None of the amine nitrates which were prepared were found to be shock sensitive to the blow of a hammer. The results of these runs are given below in Table I.

*Table I*

| Run No. | Amine Charged | Mols Nitric Acid Charged | Percent Aqueous Acid (Wt. Percent $HNO_3$) | Mols Amine Charged | Yield of Amine Nitrate, Percent | M. P. of Amine Nitrate, ° C. |
|---|---|---|---|---|---|---|
| 1 | N,N,N',N'-tetramethylethane-1,2-diamine | 0.606 | 40.5 | 0.275 | 96.3 | 220–221 |
| 2 | N,N,N',N'-tetramethylpropane-1,2-diamine | 0.606 | 33.4 | 0.275 | 92.3 | 177–179 |
| 3 | N,N,N',N'-tetramethylbutane-1,3-diamine | 0.606 | 40.5 | 0.275 | 95.0 | 115–116 |
| 3a | N,N,N',N'-tetramethylbutane-1,3-diamine | 1.19 | 70.0 | 0.578 | 97.0 | 115–116 |
| 4 | N,N,N',N'-tetramethyl-2-butyne-1,4-diamine | 0.6 | 41.0 | 0.285 | 96.4 | 145–146 |
| 5 | N,N,N',N'-tetraethylethane-1,2-diamine | 0.6 | 41.0 | 0.285 | 76.5 | 142–143 |
| 6 | N,N,N',N'-tetramethylbutane-1,4-diamine | 0.43 | 70.0 | 0.208 | 98.7 | 173–174 |
| 7 | N,N,N',N'-tetramethylbutane-1,2-diamine | 0.40 | 70.0 | 0.183 | 94.3 | 173–174 |
| 8 | Bis(N,N-dimethylaminoethyl)ether | 0.51 | 70.0 | [1] 0.25 | 72.0 | 88–93 |
| 9 | N,N,N',N'-tetramethyl-1,3-diamino-2,-propanol | 0.51 | 70.0 | 0.25 | 85.2 | 120–124 |
| 10 | N,N,N',N'-tetraethyl-1,3-diamino-2-propanol | 0.51 | 70.0 | 0.25 | 91.2 | 113–114 |
| 11 | N,N,N',N',N''-pentamethyldiethylene triamine | 0.70 | 70.0 | 0.23 | 80.0 | 162–163 |
| 12 | N,N,N',N',N'',N''-hexamethylpropane-1,2,3-triamine | 0.53 | 70.0 | 0.173 | 65.3 | 104–106 |
| 13 | N,N'-dimethylethylene-1,2-diamine | 0.505 | 60.0 | 0.5 | [2] | 125 |
| 14 | N,N,N',N'-tetramethyl-2-butene-1,4-diamine | 0.44 | 70.0 | 0.21 | 88.8 | 179–180 |
| 15 | N,N,N',N'-tetraethylpropane-1,3-diamine | 0.42 | 70.0 | 0.2 | 97.0 | 157.5–159.5 |

[1] In this run, the amine was dissolved in an equal volume of acetone.
[2] Not recorded.

EXAMPLE III

Anhydrous nitric acid prepared as described in Example I was used at the oxidant component in preparing two liquid monopropellants. In monopropellant A 4.9 weight percent (based on said acid) of ammonium persulfate was added to said acid as a stabilizer. No stabilizer was used in the acid for monopropellant B.

N,N,N'N'-tetramethylpropane-1,3-diamine dinitrate was used as the fuel component in both of said monopropellants. The composition and storage stability at 200° F. (determined as in Example I) of said monopropellants is tabulated below.

|  | Monopropellant | |
| --- | --- | --- |
|  | A | B |
| Fuel, wt. percent | 36 | 36 |
| Nitric acid, wt. percent | 64 | 64 |
| Ammonium persulfate, wt. percent of acid | 0 | 4.9 |
| Storage stability, hrs. at 200° F | 0.7 | 65.2 |

The above results show that the storage stability of the monopropellant was increased from 0.7 to 65.2 hours, thus markedly increasing the utility of said monopropellant.

It is surprising that ammonium persulfate will thus stabilize nitric acid, and result in a more stable monopropellant when said acid is used as an oxidant, because ammonium sulfate is not an effective stabilizer. The data set forth in Example IV are illustrative.

EXAMPLE IV

Anhydrous nitric acid prepared as described in Example I was used as the oxidant component in preparing a third liquid monopropellant (C) containing 64 weight percent acid and 36 weight percent of N,N,N',N'-tetramethylpropane-1,3-diamine dinitrate. Said acid contained 3.3 weight percent (based on the acid) of ammonium sulfate as a stabilizer. The storage stability at 200° F. of said monopropellant (C) was determined in the manner described in Example I above and was found to be 0.3 hour. Comparison of this value of 0.3 hour with the value of 0.7 hour for propellant A in Example III shows that ammonium sulfate is not an effective stabilizer, and in fact decreases the storage stability.

Since many possible embodiments can be made of this invention without departing from the scope thereof, it is to be understood that all matter herein set forth is to be interpreted as illustrative and not in a limiting sense.

I claim:
1. A stabilized nitric acid consisting essentially of nitric acid and from about 0.01 to about 15 weight percent of said acid of a stabilizing agent selected from the group consisting of ammonium persulfate, the alkali metal persulfates, and mixtures thereof.
2. A stabilized nitric acid according to claim 1 wherein the nitric acid to be stabilized contains at least 50 weight percent $HNO_3$.
3. A stabilized nitric acid according to claim 1 wherein the nitric acid to be stabilized contains at least 70 weight percent $HNO_3$.
4. A stabilized nitric acid according to claim 2 wherein the amount of said stabilizing agent is within the range of about 0.1 to about 10 weight percent of said acid.
5. A stabilized nitric acid according to claim 3 wherein the amount of said stabilizing agent is within the range of 0.1 to about 10 weight percent of said acid.
6. The stabilized nitric acid of claim 4 wherein said stabilizing agent is ammonium persulfate.
7. The stabilized nitric acid of claim 4 wherein said stabilizing agent is sodium persulfate.
8. The stabilized nitric acid of claim 4 wherein said stabilizing agent is potassium persulfate.
9. The stabilized nitric acid of claim 4 wherein said stabilizing agent is lithium persulfate.
10. The stabilized nitric acid of claim 4 wherein said stabilizing agent is rubidium persulfate.
11. The stabilized nitric acid of claim 4 wherein said stabilizing agent is cesium persulfate.

References Cited in the file of this patent

UNITED STATES PATENTS

| 2,489,051 | Sayward et al. | Nov. 22, 1949 |
| 2,702,984 | Britton et al. | Mar. 1, 1955 |
| 2,750,732 | Condit et al. | June 19, 1956 |
| 2,752,225 | Revallier | June 26, 1956 |
| 2,760,845 | Kanarek et al. | Aug. 28, 1956 |
| 2,837,407 | Rau | June 3, 1958 |
| 2,931,437 | Smith | Apr. 5, 1960 |

OTHER REFERENCES

AEC Document CN-728, pp. 15, 16. Report for month ending June 21, 1943. Declassified April 2, 1957. Reported in Nuclear Science Abstracts Oct. 31, 1957 (vol. 11, Item 11620).